(12) United States Patent
Richman

(10) Patent No.: US 6,813,018 B2
(45) Date of Patent: Nov. 2, 2004

(54) HYPERSPECTRAL IMAGER

(75) Inventor: Isaac Richman, Newport Coast, CA (US)

(73) Assignee: The Boeing Company, Chicago, IL (US)

(*) Notice: Subject to any disclaimer, the term of this patent is extended or adjusted under 35 U.S.C. 154(b) by 51 days.

(21) Appl. No.: 10/289,633

(22) Filed: Nov. 7, 2002

(65) Prior Publication Data

US 2004/0090623 A1 May 13, 2004

(51) Int. Cl.[7] ................................................. G01J 3/18
(52) U.S. Cl. ........................................ 356/328; 356/305
(58) Field of Search ................................. 356/305, 326, 356/328, 334

(56) References Cited

U.S. PATENT DOCUMENTS 5,305,082 A * 4/1994 Bret ............................ 356/328
5,880,834 A   3/1999 Chrisp ......................... 356/328

* cited by examiner

Primary Examiner—F. L. Evans
(74) Attorney, Agent, or Firm—Black Lowe & Graham PLLC; Dale C. Barr

(57) ABSTRACT

The hyperspectral imager includes a diffraction grating, a collecting reflecting element and a reimaging system. The diffraction grating has an entrance slit formed at an entrance slit location therein. The entrance slit has a long dimension oriented in a y-direction. The entrance slit transmits the radiation from a slice of an incoming scene image. The collecting reflecting element receives the transmitted radiation of the incoming scene image and reflects the transmitted radiation to a diffractive surface of the diffraction grating. Grooves on the diffractive surface are substantially parallel to the y-direction. The reimaging system receives radiation diffracted by the diffractive surface. The reimaging system produces a spectral image of the entrance slit at a focal surface. The spectral image provides a spectrum of radiation propagating through the entrance slit into the hyperspectral imager such that the spectrum of radiation from a first region in the y-direction. can be distinguished from the spectra of radiation from other regions in the y-direction.

20 Claims, 3 Drawing Sheets

HYPERSPECTRAL IMAGER

BACKGROUND OF THE INVENTION

1. Field of the Invention

The present invention relates to a hyperspectral imager and more particularly to a grating imaging spectrometer that minimizes optical aberrations, occupies a small packaging volume, and enables versatile coupling to front-end collecting optics that image a scene onto an entrance slit.

2. Description of the Related Art

There are three problems in designing an imaging spectrometer where light in a slice of an image field passing through an entrance slit is to be diffracted by a grating parallel to the slit and imaged onto a detector array for display or recording with good spatial resolution parallel to the slit and good spectral resolution perpendicular to the slit:

1. Eliminating astigmatism over the spectrum on the image plane.
2. Removing field curvature from the spectrum focused onto the image plane.
3. Obtaining good spatial resolution of the entrance slit; this entails eliminating astigmatism at different field angles from points on the entrance slit.

The third problem is probably the most difficult to overcome. In conventional imaging spectrometers, the spectrometer size is increased until the astigmatism at different field angles is reduced to an acceptable level. This technique is effective because increasing the spectrometer size for a given slit size reduces the field angle through the spectrometer, leading to a reduction of field aberrations such as astigmatism. But for some applications, such as for aerospace instrumentation, a small design volume is important.

U.S. Pat. No. 5,880,834, issued to M. P. Chrisp, titled, "Convex Diffraction Grating Imaging Spectrometer", discloses a 1:1 Offner mirror system for imaging off-axis objects that is modified by replacing a concave spherical primary mirror that is concentric with a convex secondary mirror with two concave spherical mirrors M1 and M2 of the same or different radii positioned with their respective distances d1 and d2 from a concentric convex spherical diffraction grating having its grooves parallel to the entrance slit of the spectrometer which replaces the convex secondary mirror. By adjusting their distances d1 and d2 and their respective angles of reflection α and β, defined as the respective angles between their incident and reflected rays, all aberrations are corrected without the need to increase the spectrometer size for a given entrance slit size to reduce astigmatism, thus allowing the imaging spectrometer volume to be less for a given application than would be possible with conventional imaging spectrometers and still give excellent spatial and spectral imaging of the slit image spectra over the focal plane.

The Chrisp instrument is forced to use a complex optical system to compensate for the off-axis slit location. In addition, its optical performance typically degrades if the magnification through the system differs significantly from 1:1. Finally, the Offner configuration offers no good location for a cold stop when it is used with collecting optics. Such a stop provides a convenient position for baffling and, in the case of infrared applications, for locating a cold stop to decrease focal surface irradiance due to near field emission.

Prism-based instruments, while typically providing a small size advantage, suffer from non-linear dispersion, and, like any instrument containing refractive optics, their alignment and focus are temperature dependent.

SUMMARY

The hyperspectral imager of the present invention includes, in a broad aspect, a diffraction grating, a collecting reflecting element and a reimaging system. The diffraction grating has an entrance slit formed at an entrance slit location therein. The entrance slit has a long dimension oriented in a y-direction. It transmits the radiation from a slice of an incoming scene image. A collecting reflecting element receives the transmitted radiation of the incoming scene image and reflects the transmitted radiation to a diffractive surface of the diffraction grating. Grooves on the diffractive surface are substantially parallel to the y-direction. A reimaging system receives radiation diffracted by the diffractive surface. The reimaging system produces a spectral image of the entrance slit at a focal surface. The spectral image provides a spectrum of radiation propagating through the entrance slit into the hyperspectral imager, such that the spectrum of radiation from a first region in the y-direction can be distinguished from the spectra of radiation from other regions in the y-direction.

Utilization of a diffraction grating having an entrance slit location therein enables the collecting reflecting element to operate substantially on-axis. This results in a minimization of optical aberrations, permits configurations with magnification differing substantially from 1:1, and, for many configurations including the preferred embodiment, provides a convenient location for a cold stop within the spectrograph. In addition, it facilitates the design and fabrication of instruments comprising optical and structural elements all fabricated from the same material, e.g., aluminum, beryllium, silicon carbide. This, in turn, permits the design and fabrication of instruments that are inherently athermal. Finally, it facilitates the design of compact instruments.

Other objects, advantages, and novel features will become apparent from the following detailed description of the invention when considered in conjunction with the accompanying drawings.

BRIEF DESCRIPTION OF THE DRAWINGS

FIG. 1b is a slit end view of the hyperspectral imager of FIG. 1a.

The same parts or elements throughout the drawings are designated by the same reference characters.

DETAILED DESCRIPTION OF THE INVENTION

Figure 1A:
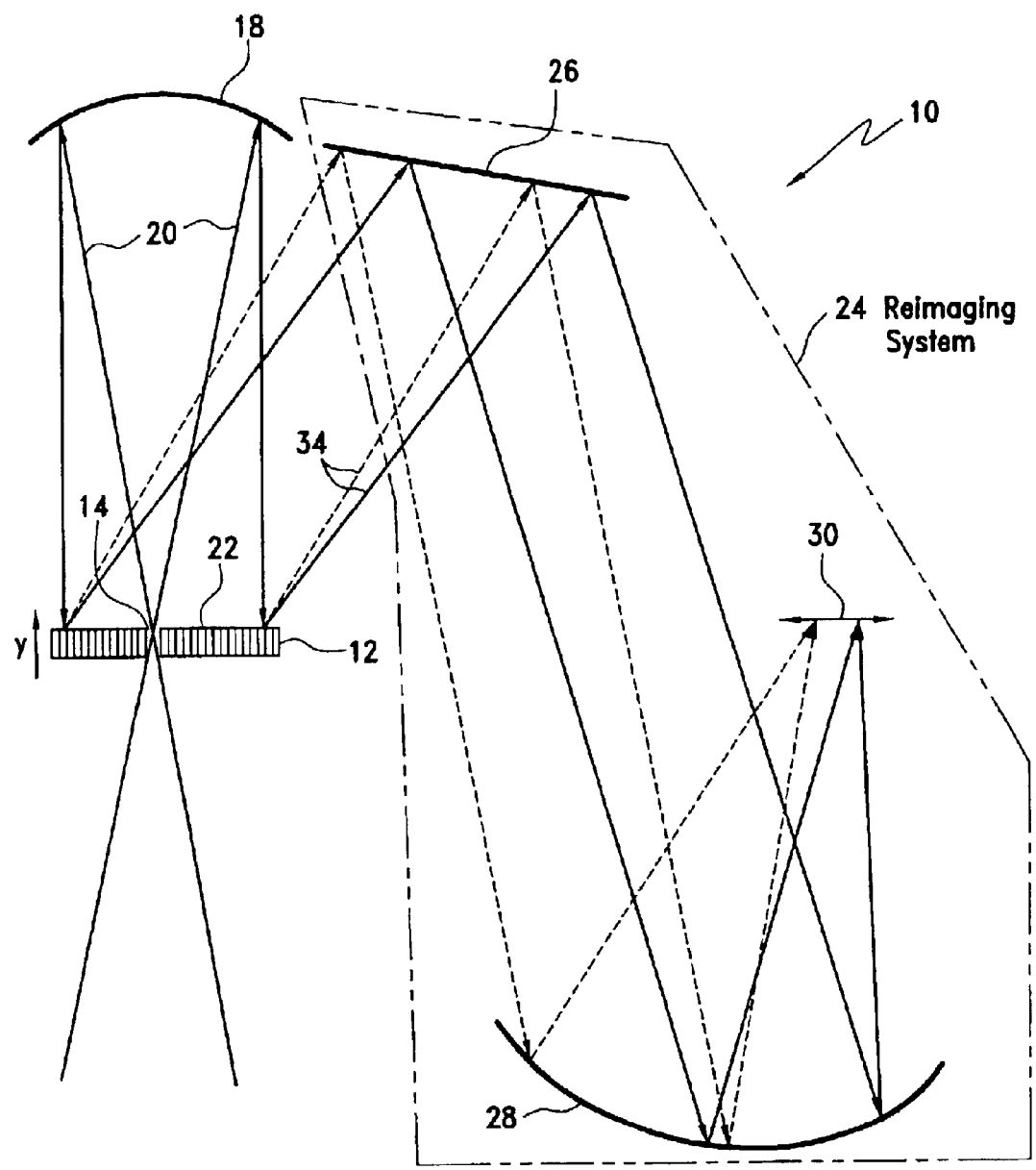
FIG. 1a is a plan view schematic illustration of the hyperspectral imager of the present invention.
Figure 1B:
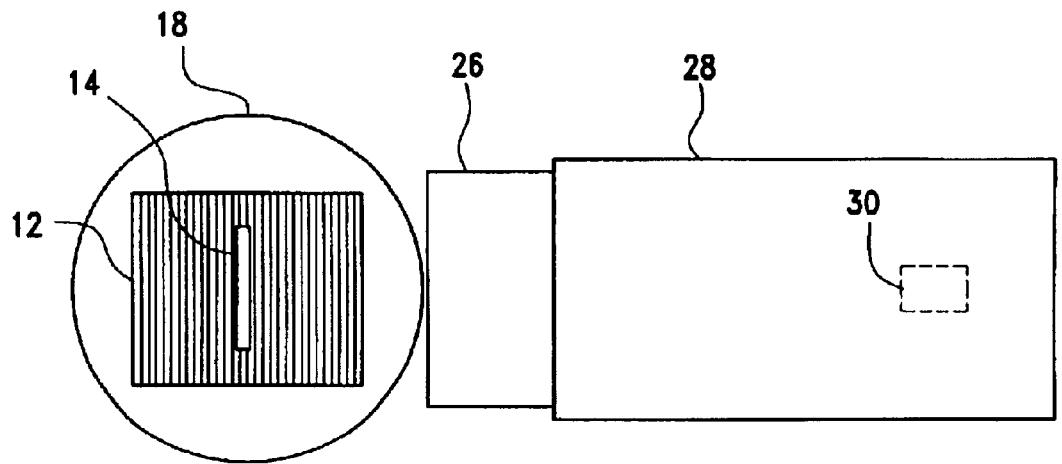

Referring now to the drawings and the characters of reference marked thereon, FIGS. 1a and 1b provide a schematic illustration of the hyperspectral imager of the present invention, designated generally as 10. The hyperspectral imager 10 includes a diffraction grating 12 having an entrance slit 14 formed at an entrance slit location therein. The entrance slit 14 has a long dimension oriented in a y-direction. The entrance slit 14 transmits the radiation from a slice of an incoming scene image. The diffraction grating 12 may be a reflection diffraction grating, as shown in the figure or alternatively, it may be a transmitting diffraction grating. Furthermore, the diffraction grating may be substantially planar, as shown, or may have a concave or convex surface or combinations thereof. Although the base diffraction grating may be commercially available, from, for example, Hyperfine or Carl Zeiss Produkt Bereich, the entrance slit 14 is specially fabricated. There may be a variety of ways for fabricating the slit 14 including, for example, electric discharge machining (EDM), chemical etching, or mechanical milling.

The slit location is preferably formed at a substantially central location of the diffraction grating 12. Use of a central location for the slit 14 enables substantially on-axis collection of radiation transmitted through the slit 14. The slit may have a substantially rectangular shape as shown in FIG. 1. Alternatively, it may have a curved shape. Furthermore, it may lie on a substantially planar surface, as shown, or lie on a curved surface. Deviation of the shape of the slit 14 from rectangular and on a planar surface may be performed to optimize the hyperspectral image on the focal surface. For example, if the monochromatic slit image at the spectrograph focal surface is curved, resulting in what is commonly referred to as "smile", this may be partly corrected by curving the entrance slit appropriately. The spectrograph optics may then be designed to compensate for slit plane curvature and other aberrations to provide a plane focal surface for the detector array.

A collecting reflecting element 18 receives the transmitted radiation 20 of the incoming scene image and reflects the transmitted radiation 20 to a diffractive surface 22 of the diffraction grating 12. Grooves on the diffractive surface 22 are substantially parallel to the y-direction. Substantial deviation from the y-direction would cause undesired spectral artifacts. As used herein, the term "groove" refers to physical rulings, etched grooves, or for some holographic gratings, regions of constant phase shift.

The collecting reflecting element 18 preferably has a reflecting curved surface having a paraboloidal shape. However, it may alternatively have a surface curvature other than paraboloidal, including planar. Furthermore, it may incorporate refractive components for improving image quality.

A reimaging system, designated generally as 24, receives radiation diffracted by the diffractive surface 22. The reimaging system 24 produces a spectral image of the entrance slit 14. The reimaging system may comprise a set of reflective or refractive, relayed or non-relayed elements or a combination thereof. Preferably, the reimaging system is a three mirror anastigmat (TMA), as will be shown below with reference to FIGS. 3–4.

Radiation diffracted from the diffractive surface 22 is reflected from a first reimaging reflecting element 26 and from a second reimaging reflecting element 28. The reimaging system 24 produces a spectral image of the entrance slit 14.

Reimaging systems other than a three mirror anastigmat may be utilized. For example, in the preferred embodiment the radiation diffracted from the grating is collimated. Any optical system designed to image collimated radiation, e.g., refractive, reflective, or catadioptric camera lenses, may be used for the reimaging system 24.

The reimaging system 24 focuses the spectral image of the slit at the focal surface 30. The focal surface 30 may be flat or curved depending on the desired application. If the detection medium is a planar detector array, the focal surface is designed to be sufficiently flat that it matches the array. If the detection medium is film or other medium that can be formed to a nonplanar shape, the optical configuration may be simplified because the requirement for a flat focal surface is relaxed.

The spectral image provides a spectrum of radiation propagating through the entrance slit 14 into the hyperspectral imager 10 such that the spectrum of radiation from a first region in the y-direction can be distinguished from the spectra of radiation from other regions in the y-direction.

Figure 2:
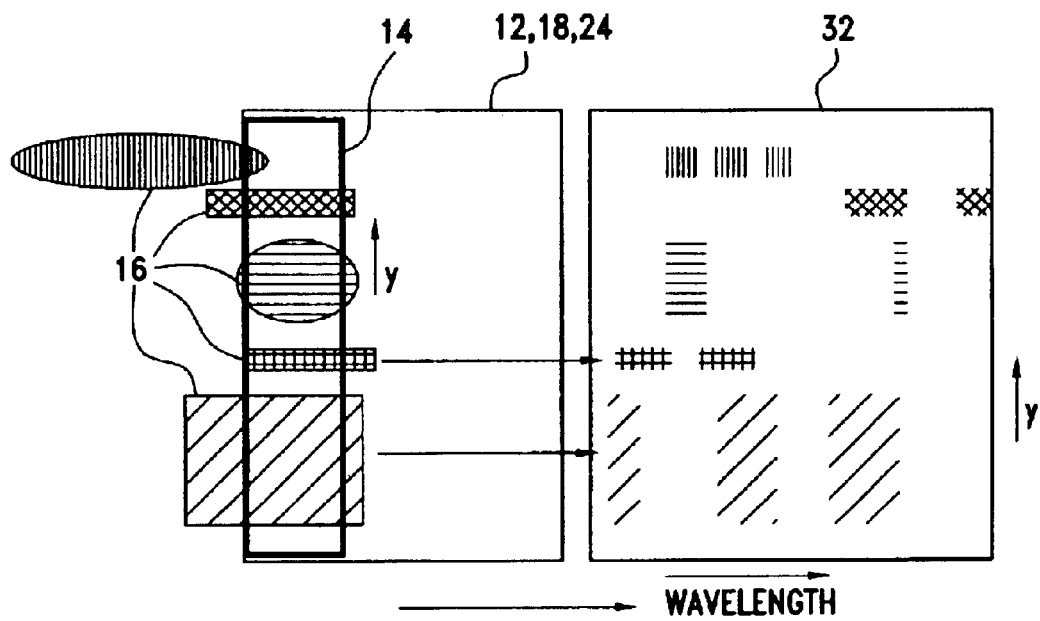
FIG. 2 is a schematic illustration of the generation of spectra from the objects in a scene utilizing the hyperspectral imager of the present invention.

Referring now to FIG. 2 as well as FIGS. 1a and 1b, the relation between the slit 14 and the resulting spectral image 32 of the slit 14 is illustrated. The entrance slit 14 transmits the radiation from a slice of the incoming scene image 16 to the collecting reflecting element 18, whence it propagates to the grating 12. The collecting reflecting element 18 collimates or otherwise alters the angular content of the radiation. The grating 12 diffracts the radiation. The diffracted radiation 34, propagates to the reimaging system 24. The reimaging system 24 focuses the radiation onto the focal surface 30. A detecting medium 36 is positioned at or near the focal surface 30, and detects the radiation contained in the spectrally dispersed image of the slit. The detecting medium 36 may be, for example, photographic film, a detector array or other suitable radiation detectors.

Figure 3:
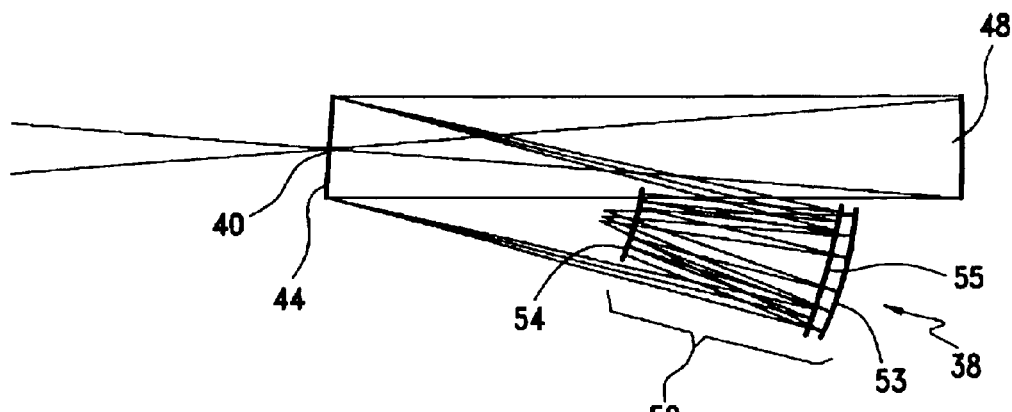
FIG. 3 is plan view of a preferred embodiment of the hyperspectral imager of the present invention.
Figure 4:
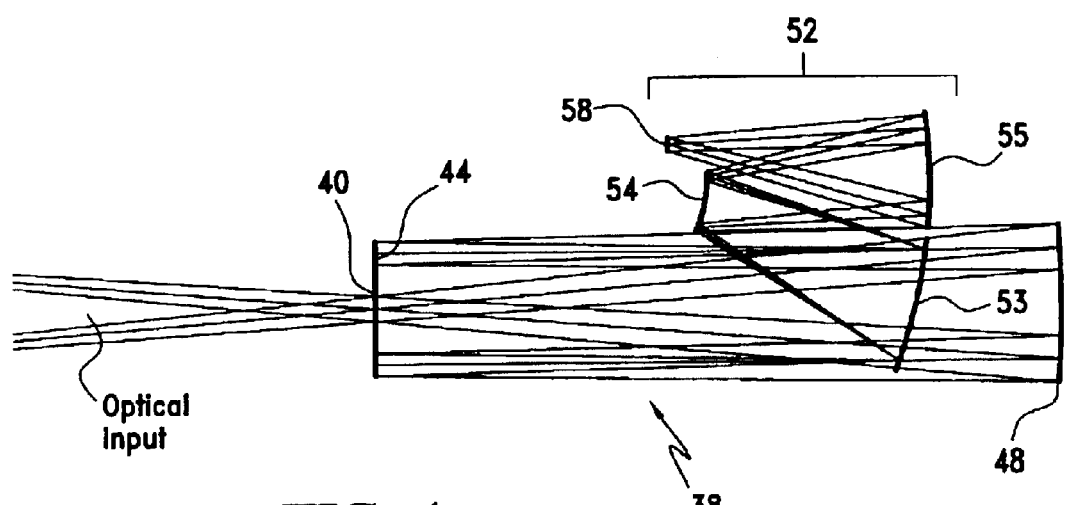
FIG. 4 is a side view of the preferred embodiment of the hyperspectral imager of FIG. 3.

FIGS. 3 and 4, illustrate a preferred embodiment of this invention, designated generally as 38. It comprises a plane rectangular entrance slit 40, a diffraction grating 44, followed by a paraboloidal collimating mirror 48, followed by a three-mirror anastigmat 52 that produces the spectrally dispersed image of the entrance slit on the focal surface 58. The three-mirror anastigmat comprises mirrors 53, 54, and 55. The direction of diffraction spreading radiation, termed the 'spectral' direction, is perpendicular to the slit long dimension. The long dimension of the entrance slit, termed the 'spatial' direction, is parallel to the y-direction, as shown in the previous figures. The entrance slit 40 is centered on the diffractive surface of the grating 44. The axis of the paraboloidal mirror 48 passes through the slit center, and is in the plane of the perpendicular bisector of the entrance slit 40. Thus, the optics operate on-axis in the spectral direction, and closely so in the spatial direction. The front-end collecting optics (not shown), image the scene onto the slit plane. With appropriate choice of optical parameters the entrance aperture of the front-end collecting optics may be reimaged at the grating surface, making that surface an ideal location for a baffle or cold stop. The three-mirror anastigmat 52 receives substantially collimated radiation from the surface of the diffraction grating 44, and produces at the focal surface 58, a spectrally-dispersed image of the entrance slit 40.

Among the many applications of this invention are the monitoring of farm crop health and water demand, monitoring for hazardous gases, identifying pollutant gases, oceanographic applications, monitoring of pollution in river waters, as well as various defense applications such as detecting camouflage.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A hyperspectral imager, comprising: a) a diffraction grating having an entrance slit formed at an entrance slit location therein, said entrance slit having a long dimension oriented in a y-direction, said entrance slit for transmitting the radiation from a slice of an incoming scene image, wherein said slit has a curved shape; b) a collecting reflecting element for receiving said transmitted radiation of the incoming scene image and reflecting said transmitted radiation to a diffractive surface of said diffraction grating, grooves on said diffractive surface being substantially parallel to said y-direction; c) a reimaging system for receiving radiation diffracted by said diffractive surface, said reimaging system for producing a spectral image of said entrance slit at a focal surface, wherein said spectral image provides a spectrum of radiation propagating through said entrance slit into the hyperspectral imager, such that the spectrum of radiation from a first region in the y-direction can be distinguished from the spectra of radiation from other regions in the y-direction.

2. The hyperspectral imager of claim 1, wherein said entrance slit is formed at a substantially central location of said diffraction grating.

3. The hyperspectral imager of claim 1, wherein said slit lies on a substantially planar surface.

4. The hyperspectral imager of claim 1, wherein said diffraction grating comprises a reflection diffraction grating.

5. The hyperspectral imager of claim 1, wherein said collecting reflecting element comprises a reflecting curved surface.

6. The hyperspectral imager of claim 1, wherein said collecting reflecting element incorporates refractive components.

7. The hyperspectral imager of claim 1, wherein said reimaging system comprises a set of reflective elements.

8. The hyperspectral imager of claim 1, wherein said focal surface is substantially planar.

9. A hyperspectral imager, comprising: a) a diffraction grating having an entrance slit formed at an entrance slit location therein, said entrance slit having a long dimension oriented in a y-direction, said entrance slit for transmitting the radiation from a slice of an incoming scene image, wherein said slit lies on a curved surface; b) a collecting reflecting element for receiving said transmitted radiation of the incoming scene image and reflecting said transmitted radiation to a diffractive surface of said diffraction grating grooves on said diffractive surface being substantially parallel to said y-direction; c) a reimaging system for receiving radiation diffracted by said diffractive surface, said reimaging system for producing a spectral image of said entrance slit at a focal surface, wherein said spectral image provides a spectrum of radiation propagating through said entrance slit into the hyperspectral imager, such that the spectrum of radiation from a first region in the y-direction can be distinguished from the spectra of radiation from other regions in the y-direction.

10. A hyperspectral imager, comprising: a) a diffraction grating having an entrance slit formed at an entrance slit location therein, said entrance slit having a long dimension oriented in a y-direction, said entrance slit for transmitting the radiation from a slice of an incoming scene image, wherein said diffraction grating comprises a transmitting diffraction grating; b) a collecting reflecting element for receiving said transmitted radiation of the incoming scene image and reflecting said transmitted radiation to a diffractive surface of said diffraction grating, grooves on said diffractive surface being substantially parallel to said y-direction; c) a reimaging system for receiving radiation diffracted by said diffractive surface, said reimaging system for producing a spectral image of said entrance slit at a focal surface, wherein said spectral image provides a spectrum of radiation propagating through said entrance slit into the hyperspectral imager, such that the spectrum of radiation from a first region in the y-direction can be distinguished from the spectra of radiation from other regions in the y-direction.

11. The hyperspectral imager of claim 10, wherein said diffraction grating has a substantially planar surface.

12. A hyperspectral imager, comprising: a) a diffraction grating having an entrance slit formed at an entrance slit location therein, said entrance slit having a long dimension oriented in a y-direction, said entrance slit for transmitting the radiation from a slice of an incoming scene image, wherein said diffraction grating has a concave surface; b) a collecting reflecting element for receiving said transmitted radiation of the incoming scene image and reflecting said transmitted radiation to a diffractive surface of said diffraction grating, grooves on said diffractive surface being substantially parallel to said y-direction; c) a reimaging system for receiving radiation diffracted by said diffractive surface, said reimaging system for producing a spectral image of said entrance slit at a focal surface, wherein said spectral image provides a spectrum of radiation propagating through said entrance slit into the hyperspectral imager, such that the spectrum of radiation from a first region in the y-direction can be distinguished from the spectra of radiation from other regions in the y-direction.

13. A hyperspectral imager, comprising: a) a diffraction grating having an entrance slit formed at an entrance slit location therein, said entrance slit having a long dimension oriented in a y-direction, said entrance slit for transmitting the radiation from a slice of an incoming scene image, wherein said diffraction grating has a convex surface; b) a collecting reflecting element for receiving said transmitted radiation of the incoming scene image and reflecting said transmitted radiation to a diffractive surface of said diffraction grating, grooves on said diffractive surface being substantially parallel to said y-direction; c) a reimaging system for receiving radiation diffracted by said diffractive surface, said reimaging system for producing a spectral image of said entrance slit at a focal surface, wherein said spectral image provides a spectrum of radiation propagating through said entrance slit into the hyperspectral imager, such that the spectrum of radiation from a first region in the y-direction can be distinguished from the spectra of radiation from other regions in the y-direction.

14. A hyperspectral imager, comprising: a) a diffraction grating having an entrance slit formed at an entrance slit location therein, said entrance slit having a long dimension oriented in a y-direction, said entrance slit for transmitting the radiation from a slice of an incoming scene image; b) a collecting reflecting element for receiving said transmitted radiation of the incoming scene image and reflecting said transmitted radiation to a diffractive surface of said diffraction grating, grooves on said diffractive surface being substantially parallel to said y-direction, wherein said collecting reflecting element comprises a substantially planar surface; c) a reimaging system for receiving radiation diffracted by said diffractive surface, said reimaging system for producing a spectral image of said entrance slit at a focal surface, wherein said spectral image provides a spectrum of radiation propagating through said entrance slit into the hyperspectral imager, such that the spectrum of radiation from a first region in the y-direction can be distinguished from the spectra of radiation from other regions in the y-direction.

15. A hyperspectral imager, comprising: a) a diffraction grating having an entrance slit formed at an entrance slit location therein, said entrance slit having a long dimension oriented in a y-direction, said entrance slit for transmitting the radiation from a slice of an incoming scene image; b) a collecting reflecting element for receiving said transmitted radiation of the incoming scene image and reflecting said transmitted radiation to a diffractive surface of said diffraction grating, grooves on said diffractive surface being substantially parallel to said y-direction, wherein said collecting reflecting element comprises a reflecting curved surface having a paraboloidal shape; c) a reimaging system for receiving radiation diffracted by said diffractive surface, said reimaging system for producing a spectral image of said entrance slit at a focal surface, wherein said spectral image provides a spectrum of radiation propagating through said entrance slit into the hyperspectral imager, such that the spectrum of radiation from a first region in the y-direction can be distinguished from the spectra of radiation from other regions in the y-direction.

16. A hyperspectral imager, comprising: a) a diffraction grating having an entrance slit formed at an entrance slit location therein, said entrance slit having a long dimension oriented in a y-direction, said entrance slit for transmitting the radiation from a slice of an incoming scene image; b) a collecting reflecting element for receiving said transmitted radiation of the incoming scene image and reflecting said transmitted radiation to a diffractive surface of said diffraction grating, grooves on said diffractive surface being substantially parallel to said y-direction, wherein said reimaging system comprises a set of refractive reimaging elements; c) a reimaging system for receiving radiation diffracted by said diffractive surface, said reimaging system for producing a spectral image of said entrance slit at a focal surface, wherein said spectral image provides a spectrum of radiation propagating through said entrance slit into the hyperspectral imager, such that the spectrum of radiation from a first region in the y-direction can be distinguished from the spectra of radiation from other regions in the y-direction.

17. The hyperspectral imager of claim 16, wherein said reimaging system comprises a set of reimaging elements comprising both reflective and refractive reimaging elements.

18. A hyperspectral imager, comprising: a) a diffraction grating having an entrance slit formed at an entrance slit location therein, said entrance slit having a long dimension oriented in a y-direction, said entrance slit for transmitting the radiation from a slice of an incoming scene image; b) a collecting reflecting element for receiving said transmitted radiation of the incoming scene image and reflecting said transmitted radiation to a diffractive surface of said diffraction grating, grooves on said diffractive surface being substantially parallel to said y-direction; c) a reimaging system for receiving radiation diffracted by said diffractive surface, said reimaging system for producing a spectral image of said entrance slit at a focal surface, wherein said reimaging system comprises a set of reimaging elements comprising a three mirror anastigmat, and wherein said spectral image provides a spectrum of radiation propagating through said entrance slit into the hyperspectral imager, such that the spectrum of radiation from a first region in the y-direction can be distinguished from the spectra of radiation from other regions in the y-direction.

19. A hyperspectral imager, comprising: a) a diffraction grating having an entrance slit formed at an entrance slit location therein, said entrance slit having a long dimension oriented in a y-direction, said entrance slit for transmitting the radiation from a slice of an incoming scene image; b) a collecting reflecting element for receiving said transmitted radiation of the incoming scene image and reflecting said transmitted radiation to a diffractive surface of said diffraction grating, grooves on said diffractive surface being substantially parallel to said y-direction; c) a reimaging system for receiving radiation diffracted by said diffractive surface, said reimaging system for producing a spectral image of said entrance slit at a focal surface, wherein said focal surface is curved, and wherein said spectral image provides a spectrum of radiation propagating through said entrance slit into the hyperspectral imager, such that the spectrum of radiation from a first region in the y-direction can be distinguished from the spectra of radiation from other regions in the y-direction.

20. A method for hyperspectral imaging, comprising the steps of: a) transmitting radiation from a slice of an incoming scene image through an entrance slit formed at an entrance slit location of a diffraction grating, said entrance slit having a long dimension oriented in a y-direction, said entrance slit having a curved shape; b) receiving said transmitted radiation via a collecting reflecting element and reflecting said transmitted radiation to a diffractive surface of said diffraction grating, grooves on said diffractive surface being substantially parallel to said y-direction; c) receiving radiation diffracted by said diffractive surface and producing a spectral image of said entrance entrance slit at a focal surface, wherein said spectral image provides a spectrum of radiation propagating through said entrance slit into the hyperspectral imager, such that the spectrum of radiation from a first region in the y-direction can be distinguished from the spectra of radiation from other regions in the y-direction.

\* \* \* \* \*